(12) United States Patent
Ren et al.

(10) Patent No.: US 9,444,948 B1
(45) Date of Patent: Sep. 13, 2016

(54) PORTAL FOR TOLL FREE MEDIA SUBSCRIPTION CAMPAIGNS

(71) Applicant: Verizon Patent and Licensing Inc., Arlington, VA (US)

(72) Inventors: Dahai Ren, Lincoln, MA (US); Susan Kelly, Maynard, MA (US); Okeno Palmer, Woburn, MA (US); Shuai Wu, Wellesley, MA (US); Fengping Zhang, Burlington, MA (US); Ming Chen, Bedford, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 0 days.

(21) Appl. No.: 14/644,267

(22) Filed: Mar. 11, 2015

(51) Int. Cl.
*H04M 15/00* (2006.01)
*H04M 15/06* (2006.01)
*H04M 15/08* (2006.01)

(52) U.S. Cl.
CPC .............. *H04M 15/72* (2013.01); *H04M 15/85* (2013.01)

(58) Field of Classification Search
CPC . H04L 12/1407; H04M 15/51; H04M 15/66; H04M 15/70; H04M 15/72; H04M 15/85; H04N 21/232; H04N 21/2353; H04N 21/26258; H04N 21/2665; H04N 21/2668; H04N 21/454; H04N 21/4622; H04N 21/47202; H04N 21/4825; H04N 21/6125
USPC ...... 455/3.01, 406, 405, 3.05, 411; 370/252, 370/315, 328; 705/14.69, 26.25, 26.61, 35, 705/59, 224, 26.1, 26.5, 14.55
See application file for complete search history.

(56) References Cited

U.S. PATENT DOCUMENTS

| | | | |
|---|---|---|---|
| 2014/0094138 A1* | 4/2014 | Saker | H04L 12/1407 455/406 |
| 2014/0130182 A1* | 5/2014 | Yackanich | G06F 21/60 726/27 |
| 2015/0058880 A1* | 2/2015 | Earle | H04N 21/4825 725/32 |
| 2015/0249651 A1* | 9/2015 | Okamoto | H04L 63/08 713/171 |
| 2015/0312127 A1* | 10/2015 | Leemet | H04L 41/5032 709/224 |
| 2015/0341216 A1* | 11/2015 | Cooppan | H04L 41/0816 709/221 |

* cited by examiner

*Primary Examiner* — Inder Mehra

(57) ABSTRACT

A first network device receives multiple subscription data campaigns, where each of the multiple subscription data campaigns comprises media content, a free data usage quota, and a price for receiving the media content, presents the multiple subscription data campaigns to a user device associated with a user, and receives a selection of one of the multiple subscription data campaigns from the user device. The first network device receives, from a second network device, an indication that the user has successfully subscribed to the selected one of the multiple subscription data campaigns, where the second network device hosts media content associated with the selected one of the multiple subscription data campaigns, generates an authorization token that includes an identifier of the user, an identifier of the selected one of the multiple subscription data campaigns, and the free data usage quota, and sends the authorization token to the second network device.

20 Claims, 15 Drawing Sheets

PORTAL FOR TOLL FREE MEDIA SUBSCRIPTION CAMPAIGNS

BACKGROUND

Wireless data plans allow mobile subscribers to access content and/or applications ("apps") through mobile devices. Data usage for end users is typically charged to an account associated with an end user. The end user's account may have a periodic limit on total data usage, for example on wireless networks (e.g., a 2 Gigabytes per month data plan). End users on networks that have periodic limits for data usage often arrange their data usage behavior to avoid overages associated with periodic limits on data usage. For example, an end user may curtail online shopping, or other activity when they are approaching or have exceeded the periodic limit.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Toll-Free Data (TFD) service allows mobile subscribers to access content without impacting their monthly wireless data plan for at least an allocated quota of free network usage (e.g., a limited quota of data usage that is not charged to the mobile subscriber's personal account, but is charged to the network service provider and/or the content provider that delivers the content). TFD service enables mobile subscribers to reduce the data consumption billed to their mobile accounts when receiving media content from content providers, and the content providers can increase their digital presence and potentially increase their product sales by offering their media content via TFD service. TFD service, therefore, offers a data consumption model that can benefit consumers, sponsoring companies, and network service providers.

Exemplary embodiments described herein use a TFD service, as applied to media content publishing and delivery, in which multiple different content providers create subscription data campaigns and submit them for publication via a campaign portal. The campaign portal serves as a centralized access point for device end users, who receive network connectivity via a network service provider, to access and subscribe to the media content that is part of the subscription data campaigns. Each of the subscription data campaigns includes media content being offered by a content provider, a price associated with delivery of the media content from the content provider via the network service provider's network, and a toll free data usage quota associated with network usage of the network service provider's network. Therefore, when a user is granted a subscription to media content associated with a given subscription data campaign, the user may receive delivery of the media content from the content provider to the user's device over the network, with the network usage associated with the delivery of the media content over the network being free, or with reduced usage charges being applied, due to the toll free data usage quota allocated to the user upon subscription.

Figure 1:
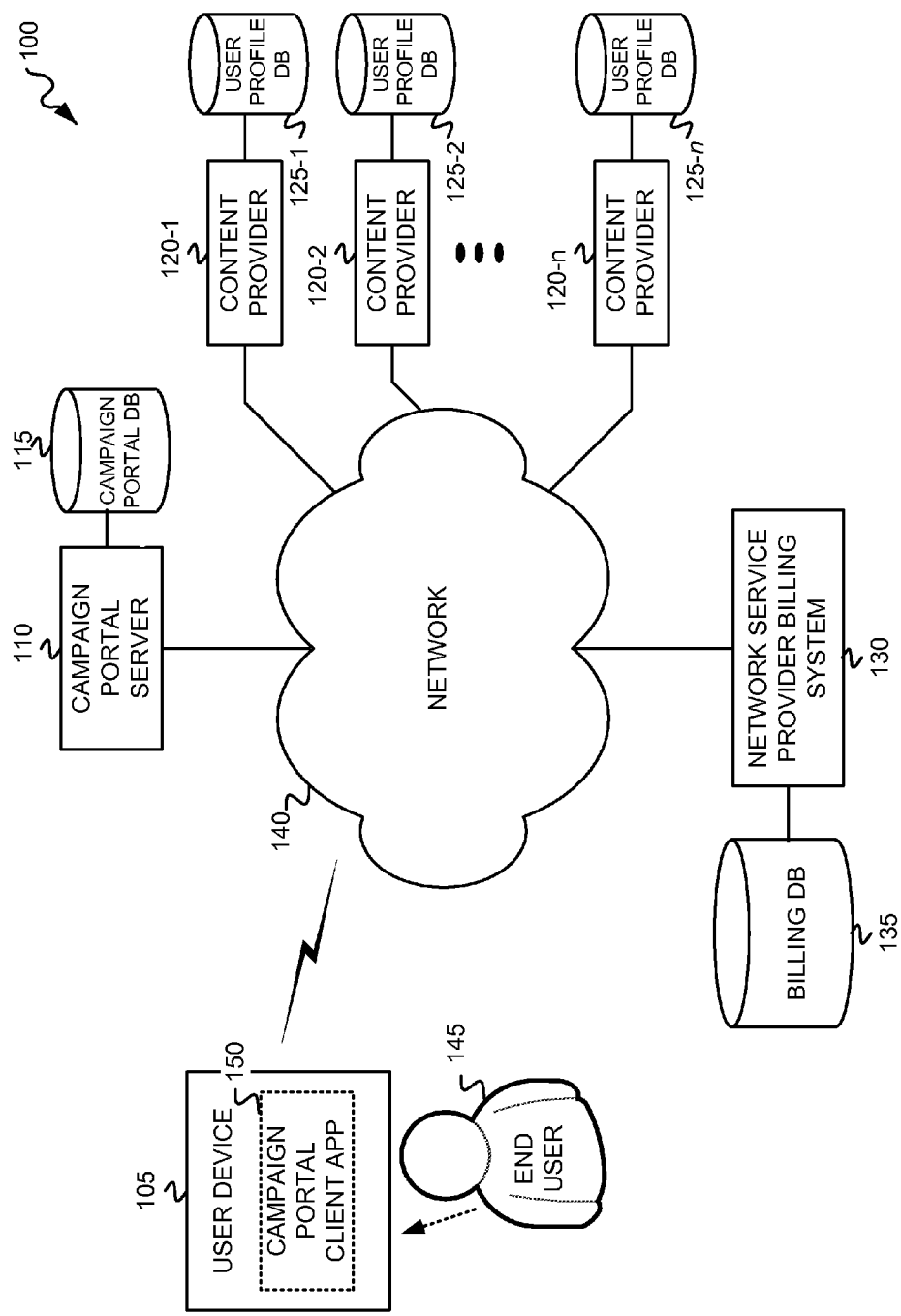
FIG. 1 illustrates an exemplary network environment in which subscriptions to certain data campaigns, that include the delivery of media content at free or reduced cost network service provider access charges, and which are published at a campaign portal for possible access by end users of the network service provider.

FIG. 1 illustrates an exemplary network environment 100 in which subscriptions to certain data campaigns, that include the delivery of media content (e.g., video content) at free or reduced cost network service provider access charges, are published at a campaign portal for access by end users of the network service provider. As depicted in FIG. 1, network environment 100 may include a user device 105, a campaign portal server 110, a campaign portal database (DB) 115, one or more content providers 120-1 through 120-n (generically and individually referred to herein as "content provider 120" and collectively referred to herein as "content providers 120"), one or more user profile DBs 125-1 through 125-n (generically and individually referred to herein as "user profile DB 125" and collectively referred to herein as "user profile DBs 125"), a network service provider billing system 130, a billing DB 135 and a network 140.

User device 105 may include any type of electronic device that may connect with network 140 via a wired or wireless connection, and which may receive media (e.g., audio and/or video media) via, for example, network 140, and play the media for listening and/or viewing by end user 145. User device 105 may include, for example, a cellular telephone (e.g., a smart phone), a personal digital assistant (PDA), a vehicular communication system, or a computer (e.g., tablet, desktop, palmtop, laptop, or wearable computer). As shown, an end user 145 may be associated with user device 105. End user 145 may be a subscriber to a network service provider, such as a cellular network service provider, that may own and/or use user device 105. A campaign portal client app 150 may be installed at user device 105 and executed to permit end user 145 to access subscription data campaigns published by campaign portal server 110 and to request a subscription to one or more particular subscription data campaigns, as described in further detail below. Campaign portal client app 150 may additionally permit end user 145 to select subscription data campaigns successfully subscribed to, and to receive and playback delivered media corresponding to the selected subscription data campaigns.

Campaign portal server 110 may include one or more network devices that receive and store information related to toll free subscription data campaigns from content providers 120-1 through 120-*n* in campaign portal DB 115. Campaign portal server 110 also receives campaign subscription requests from end user 145 (and other end users not shown in FIG. 1), passes the subscription request to a respective content provider 120 associated with the campaign, receives a return campaign qualification message from content provider 120, and generates an authorization token for sending to user device 105 associated with the requesting end user 145. As described in further detail below, the authorization token may include, for example, data identifying end user 145, data identifying the requested campaign, and a quota of data allocated to end user 145 for receiving media associated with the requested campaign. Campaign portal server 110 may encrypt the authorization token and send it to user device 105 of end user 145, and to the content provider 120 that qualified end user 145's subscription.

Campaign portal DB 115 may include a network device that stores a data structure having data fields that further store campaign information, provided by content providers 120-1 through 120-*n*, and also stores end user campaign subscription information. An exemplary implementation of the data stored in campaign portal DB 115 is described in further detail with respect to FIG. 4.

Each of content providers 120-1 through 120-*n* may include one or more network devices that stores media content, generates subscription data campaigns, publishes those subscription data campaigns to network service provider end users via campaign portal server 110, and provides media content related to subscription campaigns to user device 105 of end user 145. For example, content provider 120-1 may send media content associated with a subscription campaign to user device 105 after end user 145 has successfully subscribed to the subscription data campaign via campaign portal server 110. The media content may include audio and/or video media content, such as, for example, movies or television programming. In some implementations, the media content may include streaming media.

User profile DB 125 may include a network device that stores a data structure having data fields that further store end user information, including end user identifiers, end user profiles, and authorization tokens generated by campaign portal server 110 for successfully subscribed subscription data campaigns. An exemplary implementation of the data stored in user profile DB 125 is described in further detail with respect to FIG. 3.

Network 140 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). In one embodiment, network 140 may include one or more PLMNs connected to one or more other networks, such as, for example, the Internet. Each PLMN may be operated by an entity referred to herein as a "network service provider" that owns, maintains, and/or operates the infrastructure associated with that PLMN. Network 140 may also include a content delivery network (CDN) used to deliver media content from content providers 120-1 through 120-*n* to user device 105 via the PLMNs.

Content delivery networks (CDNs) include interconnected systems of servers that can rapidly and cost effectively deliver a variety of digital content to numerous end points, such as web browsers, mobile devices, set-top boxes and gaming consoles, via, for example, the Internet. CDNs include large distributed systems of servers located in multiple data centers in the Internet. CDN nodes are typically deployed in multiple different locations, often across multiple different backbones. The number of nodes and servers of a CDN varies, depending on the CDN's architecture. CDNs serve various forms of content, including text, graphics, Uniform Resource Locators (URLs), scripts, media files, software, documents, applications, social networks, and streaming media. For serving content via streaming media, CDNs may, for example, use Hypertext Transfer Protocol (HTTP) Live Streaming (HLS). HLS is a HTTP-based media streaming communications protocol that involves breaking the media stream into a sequence of file downloads. Each file may be downloaded as one portion of a transport stream. Each downloaded file may be played in sequence to present a continuous media stream. Other media formats, and media delivery protocols, may also be used when delivering media from content providers 120-1 through 120-*n* to user device 105.

Network service provider billing system 130 (hereinafter "billing system 130") includes a network device that maintains billing information associated with end user 145's use of the network operated by the network service provider (e.g., the PLMN). Billing system 130 may keep track of end user 145's usage allocation (e.g., megabytes (MB) or gigabytes (GB) of data, number of minutes, etc.) based on end user 145's paid network service usage plan. Billing system 130 may store end user 145's network service usage information in billing DB 135. Billing DB 135 may store data similar to that described below with respect to campaign portal DB 115 of FIG. 4. In some implementations, billing DB 135 and campaign portal DB 115 may include a same database connected so as to be accessible to both campaign portal server 110 and billing system 130.

The configuration of network components of network environment 100 illustrated in FIG. 1 is for illustrative purposes. Other configurations may be implemented. Therefore, network environment 100 may include additional, fewer and/or different components that may be configured in a different arrangement than those depicted in FIG. 1. For example, though only a single user device 105, and end user 145 are shown in FIG. 1, network environment 100 may include multiple different user devices 105, and multiple different respective end users 145.

Figure 2:
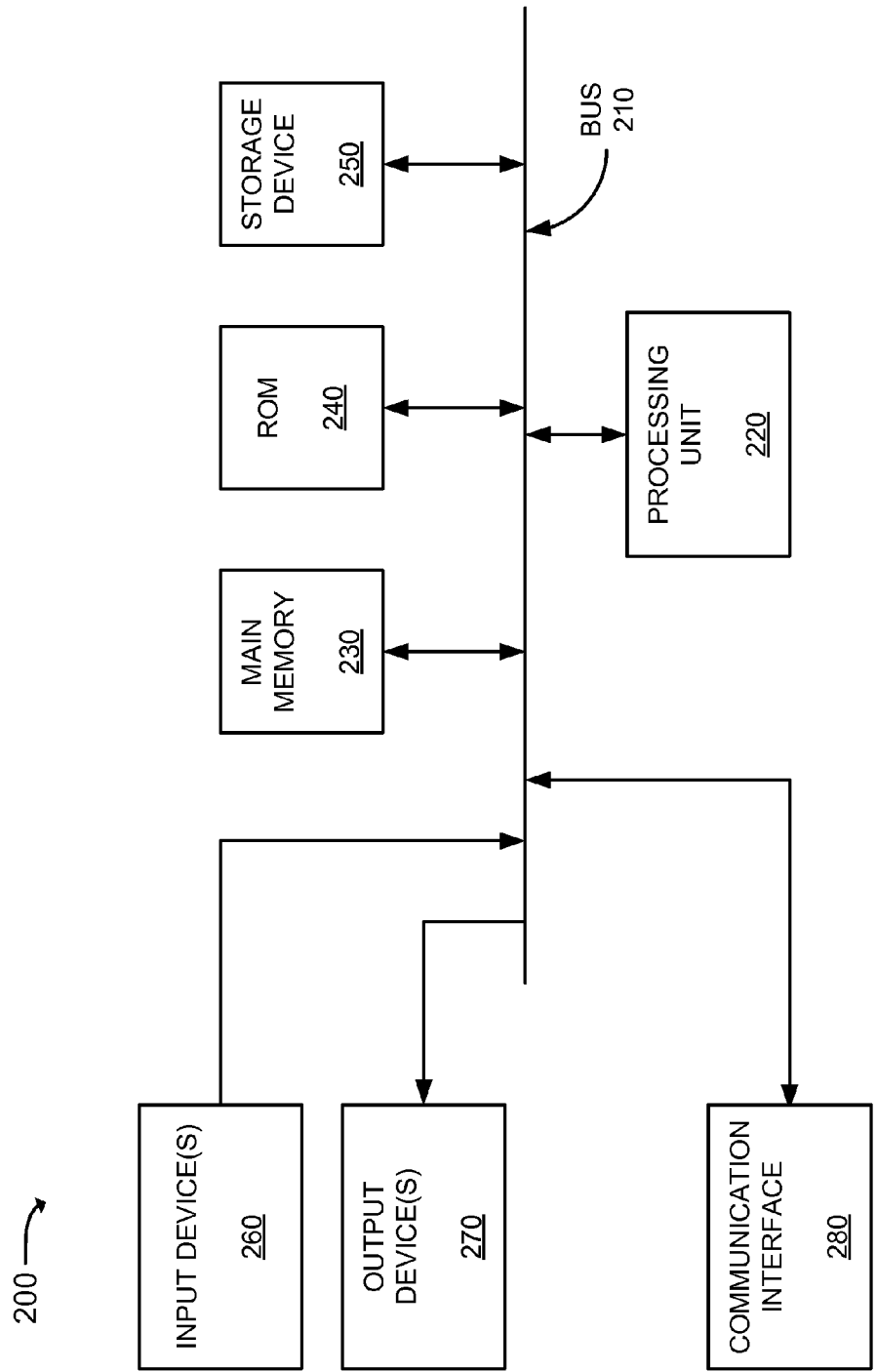
FIG. 2 is a diagram that depicts exemplary components of a device that may correspond to the user device, campaign portal server, content providers, campaign portal database, user profile database, billing system and/or billing database of FIG. 1.

FIG. 2 is a diagram that depicts exemplary components of a device 200. User device 105, campaign portal server 110, campaign portal DB 115, content providers 120-1 through 120-*n*, user profile DB 125-1 through 125-*n*, network service provider billing system 130 and billing DB 135 may each be configured identical to, or similar to, device 200.

Device 200 may include a bus 210, a processing unit 220, a main memory 230, a read only memory (ROM) 240, a storage device 250, an input device 260, an output device 270, and a communication interface 280. Bus 210 may include a path that permits communication among the components of device 200.

Processing unit 220 may include one or more processors or microprocessors, or processing logic, which may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium. Main memory 230, ROM 240 and storage device 250 may each be referred to herein as a "tangible, non-transitory computer-readable medium." The processes/methods described herein can be implemented as instructions that are stored in main memory 230, ROM 240 and/or storage device 250 for execution by processing unit 220.

Input device 260 may include one or more mechanisms that permit a user to input information to device 200, such as, for example, a keypad or a keyboard, a display with a touch sensitive panel, voice recognition and/or biometric mechanisms, etc. Output device 270 may include one or more mechanisms that output information to the operator, including a display, a speaker, etc. Input device 260 and output device 270 may, in some implementations, be implemented as a graphical user interface (GUI) that displays GUI information and which receives user input via the GUI. Communication interface(s) 280 may include a transceiver that enables device 200 to communicate with other devices and/or systems. For example, communication interface(s) 280 may include wired or wireless transceivers for communicating via network 140.

The configuration of components of device 200 illustrated in FIG. 2 is for illustrative purposes. Other configurations may be implemented. Therefore, device 200 may include additional, fewer and/or different components, or differently arranged components, than those depicted in FIG. 2.

Figure 3:
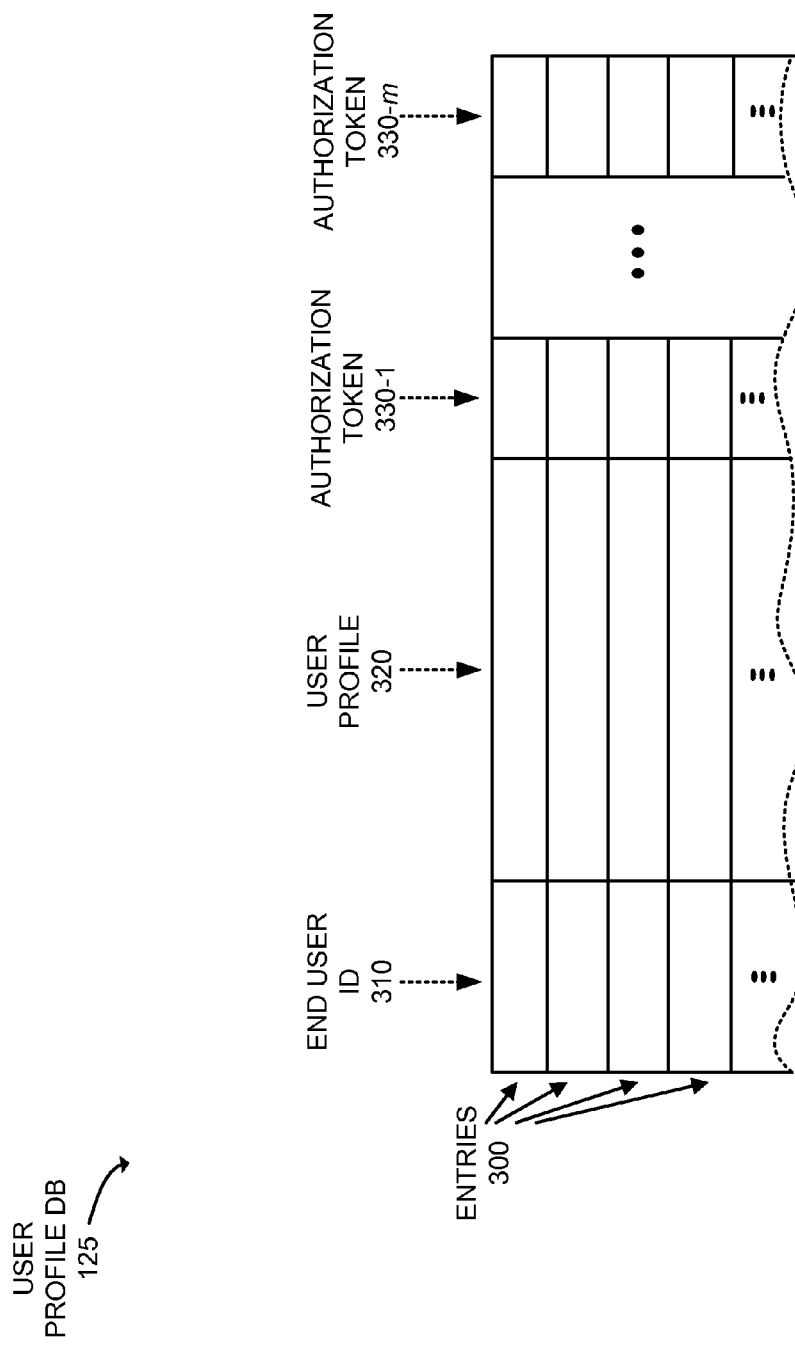
FIG. 3 is a diagram that depicts an exemplary data structure associated with the user profile database of FIG. 1.

FIG. 3 is a diagram that depicts an exemplary data structure associated with user profile DB 125. User profile DB 125 may include multiple entries 300, each of which may include an end user identifier (ID) field 310, a user profile field 320, and one or more authorization token fields 330-1 through 330-m.

End user ID field 310 may store a unique identifier of end user 145 associated with user device 105. User profile field 320 may store data associated with a user profile of the end user 145 identified in end user ID field 310. The user profile may include end user 145's log-in name and user password, past usage history of media content hosted by content provider 120, and known interests of end user 145. The past usage history may include a history of all activity end user 145 has engaged in with respect to being provided media content from content provider 120. The known interests of end user 145 may have been previously explicitly obtained from end user 145 (e.g., via an on-line survey), or may be information inferred from end user 145's past usage history.

Authorization token fields 330-1 through 330-m may each store an authorization token, generated by campaign portal server 110, that is used to verify end user 145's subscription to a specific subscription data campaign that is published via campaign portal server 110.

The number and content of the fields of each entry 300 of user profile DB 125 is for illustrative purposes. Each entry 300 of user profile DB 125 may include additional, fewer and/or different fields than those depicted in FIG. 3. For example, a given end user 145 may be associated (e.g., own, rent or use) with multiple different user devices 105 (e.g., a smart phone, a desktop computer, and a tablet computer), and each user device 105 may have an entry 300 in DB 125. User profile DB 125 is depicted in FIG. 3 as a tabulated data structure for purposes of illustration. Other types of data structures (e.g., linked lists, etc.), not shown, may also be used for associating data fields 310, 320, and 330-1 through 330-m within DB 125.

Figure 4:
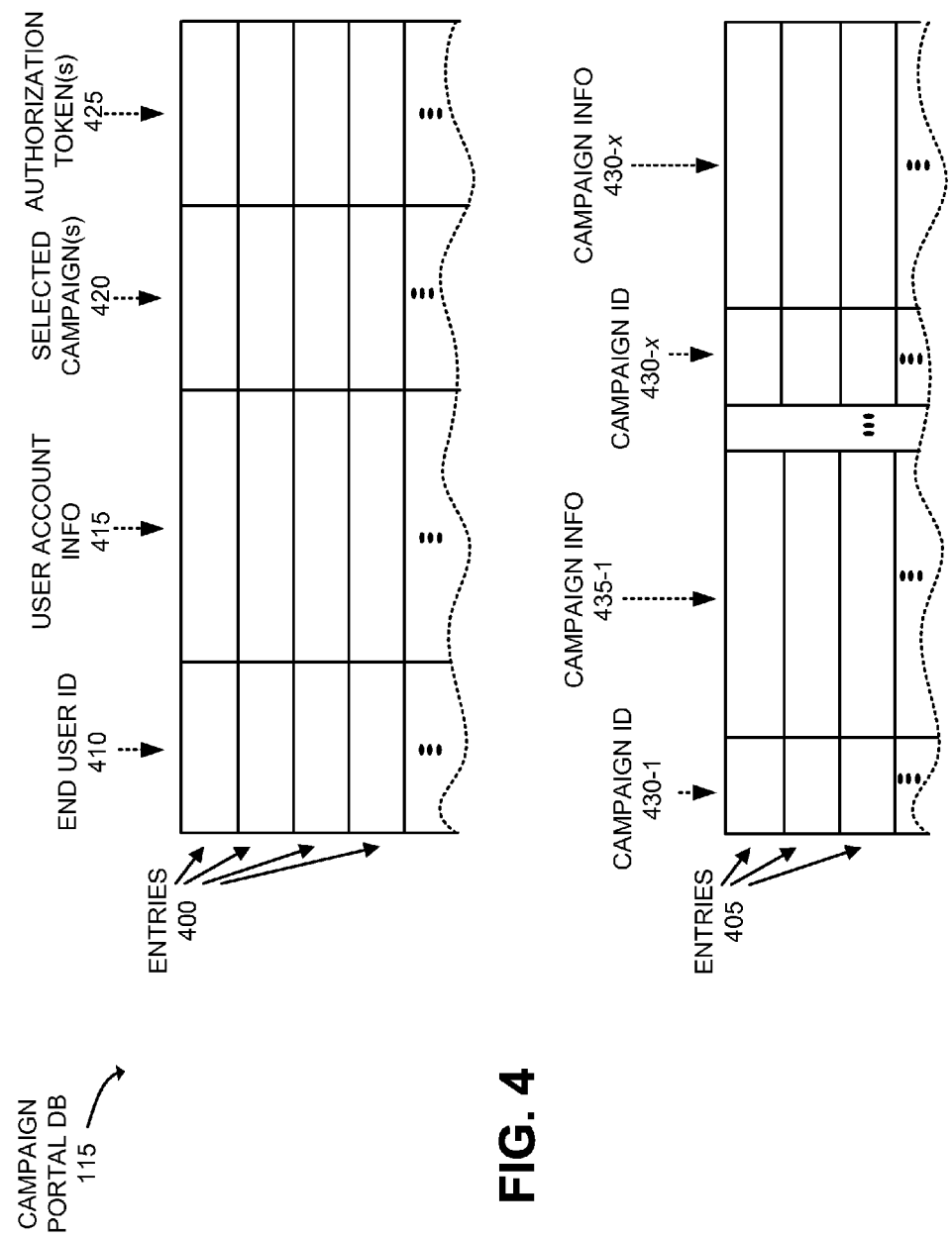
FIG. 4 is a diagram that depicts an exemplary data structure associated with the campaign portal database of FIG. 1.

FIG. 4 is a diagram that depicts an exemplary data structure associated with campaign portal DB 115. Campaign portal DB 115 may include multiple entries 400 and/or 405. Each of entries 400 may include an end user ID field 410, a user account information field 415, a selected campaign(s) field 420 and an authorization token(s) field 425. Each of entries 405 may include one or more campaign ID fields 430-1 through 430-x, and corresponding campaign information fields 435-1 through 435-x.

End user ID field 410 stores data that uniquely identifies an end user 145. User account info field 415 stores account data associated with the end user 145 identified in end user ID field 410. The account information may include, for example, log-in information associated with end user 145's registered account with campaign portal server 110.

Selected campaign(s) field 420 stores data that identifies one or more subscription data campaigns to which the end user 145, identified by the identifier stored in end user ID field 410, has successfully subscribed. Authorization token (s) field 425 may store an authorization token, received from campaign portal server 110 for each subscription campaign to which the end user 145 has successfully subscribed.

Each of campaign ID fields 430-1 through 430-x stores a unique identifier associated with a subscription campaign of a respective content provider 120. Each of campaign info fields 435-1 through 435-x stores information for a respective subscription campaign. The information may include information to be published by campaign portal server 110 and presented for viewing by end user 145, such as, for example, advertising information (e.g., image, audio, video) about the media content associated with the particular subscription campaign, or details of the subscription campaign (e.g., price of the media content, and a quota of allocated toll free data).

The number and content of the fields of each entry 400 or 405 of campaign portal DB 115 is for illustrative purposes. Each entry 400 or 405 of campaign portal DB 115 may include additional, fewer and/or different fields than those depicted in FIG. 4. Campaign portal DB 115 is depicted in FIG. 4 as a tabulated data structure for purposes of illustration. Other types of data structures (e.g., linked lists, etc.), not shown, may also be used for associating data fields 410, 415, 420 and 425; and data fields 430 and 435; within DB 115.

Figure 5:
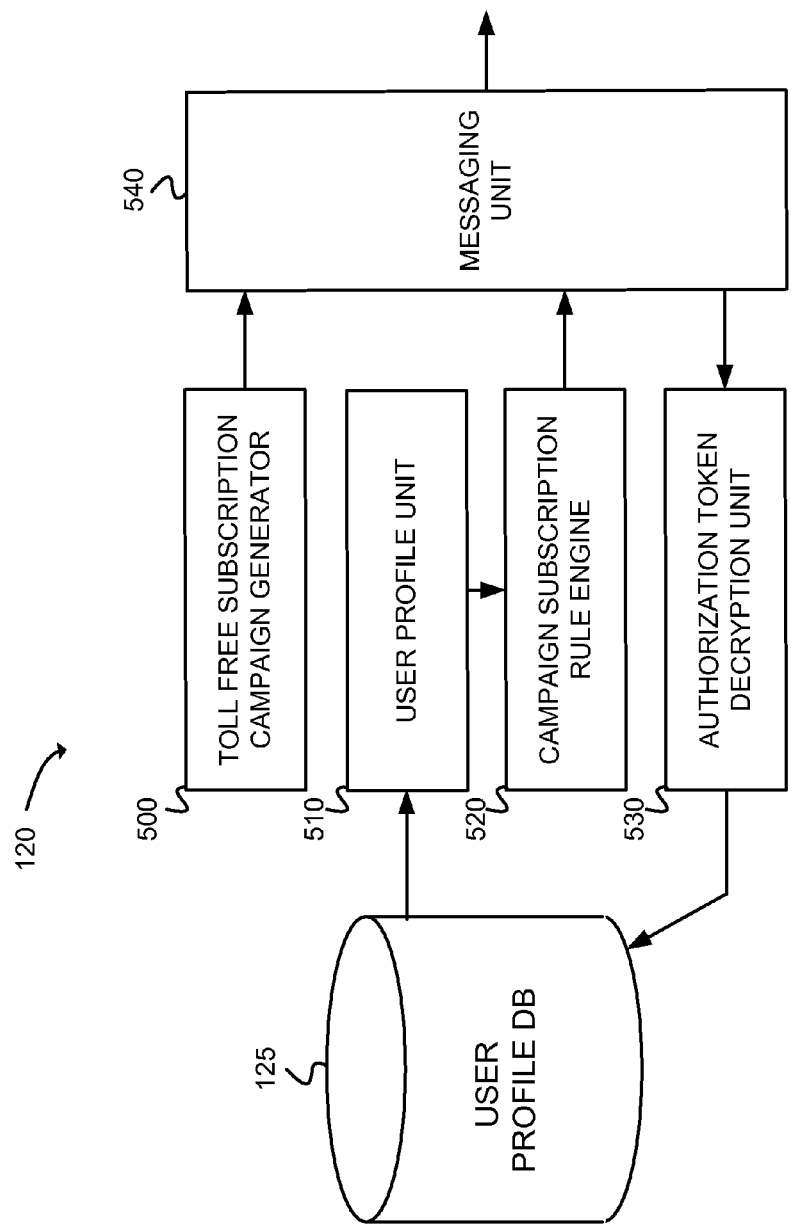
FIG. 5 is a diagram illustrating functional components of a content provider of FIG. 1.

FIG. 5 is a diagram illustrating functional components of a content provider 120. As shown in FIG. 5, content provider 120 may include a toll free subscription campaign generator 500, a user profile unit 510, a campaign subscription rule engine 520, an authorization token decryption unit 530, and a messaging unit 540. FIG. 5 further depicts the functional components of content provider 120 connected to user profile DB 125. Since, as described above, content provider 120 may include one or more network devices, the functional components depicted in FIG. 5 may be implemented in a single network device, or implemented in multiple different, distributed network devices.

Toll free subscription campaign generator 500 may generate a media content subscription data campaign and may enter into an agreement, with a network service provider (e.g., a PLMN network service provider), regarding a campaign subscription model for offering the subscription data campaign to interested end users of a network service provider. The campaign subscription model may involve campaign portal server 110 publishing a given subscription data campaign for possible subscription by end user 145, where end user 145 is charged a fee for accessing specific media data at content provider 120 for delivery from content provider 120 via a network service provider's network to user device 105 and where all, or at least a portion of, network usage allocated to the end user 145 (e.g., bytes or megabytes of data usage) is free to end user 145 (e.g., during delivery of the specific media data from content provider 120 to user device 105, or for other end user network usage activities). The campaign subscription model may permit only a limited number of end user subscriptions to the specific media content (e.g., the first qualifying 500 end users). The campaign subscription model may further require each end user attempting to subscribe to the campaign to meet certain qualifying criteria, with the qualifying criteria being implemented via campaign subscription rule engine 530 below. Therefore, content provider 120 may enter in an agreement with the network service provider to publish one or more subscription data campaigns via campaign portal server 110 at a certain per subscription (per end user 145) price, where content provider may receive a certain first percentage of the subscription price (e.g., 80%) and the network service provider may receive a second percentage of the subscription price (e.g., 20%), and the network service provider agrees to allocate a certain quota of toll free network usage to the subscribing end user. The end user may choose to use the allocated quota of toll free network usage for receiving media content delivered from content provider 120 to user device 105 via the network service provider's network (e.g., PLMN network). For example, end user 145, who subscribes to a certain subscription campaign, may be allocated a free quota of 200 megabytes of network usage.

User profile unit 510 may maintain user profile data in user profile DB 125, and may retrieve user profile data for end users attempting to subscribe to a subscription data campaign. User profile unit 510 may provide selected items of data from the retrieved user profile data to campaign subscription rule engine 520.

Campaign subscription rule engine 520 may implement a set of subscription rules that determine which end users may, or may not, qualify to subscribe to a given subscription data campaign being offered by a content provider 120 via campaign portal server 110. The set of subscription rules, for example, may randomly choose which end users qualify to subscribe to the subscription data campaign when those end users have little or no data in their user profiles. For established end users, having extensive user profiles maintained by user profile unit 510, the set of subscription rules implemented by rule engine 520 may qualify end users who previously utilized toll free data more effectively than other end users. For example, an end user who previously utilized 2 Gigabytes (GB) of free data usage allocated to him/her by watching two paid high definition (HD) movies may be qualified for the subscription data campaign, whereas another end user that only used ten percent of 2 GB of the free data usage allocated to him/her and spent nothing on paid content may be disqualified for the subscription data campaign.

Authorization token decryption unit 530, upon notification of campaign portal server 110 of the qualification of the subscription request from end user 145, may receive an encrypted authorization token generated by campaign portal server 110 for end user 145's subscription request. The authorization token may include a set of data that further includes an identifier of end user 145, an identifier of the subscription data campaign, and a data quota allocated to end user 145. The data quota may include an amount of network service usage (e.g., in MB or GB) that end user 145 may utilize for free while communicating via the network service provider's network (e.g., the PLMN). Upon receipt of the encrypted token, decryption unit 530 may decrypt the token to extract the set of data. Campaign portal server 110 and content provider 120 may use any type of mutually agreed upon encryption/decryption algorithm for encrypting and decrypting the authorization token. Decryption unit 530 may store the decrypted authorization token in an authorization token field 330 in an entry 300 in which end user 145's identifier matches a value stored in end user ID field 310.

Messaging unit 540 may receive information associated with a generated toll free subscription campaign from generator 500 and may send the information to campaign portal server 110. Messaging unit 540 may also receive a subscription qualification notification from rule engine 520, indicating that a particular end user 145 has qualified to subscribe to a subscription data campaign, and may send a message to campaign portal server 110 to notify it of the qualification. Messaging unit 510 may further receive encrypted authorization tokens from campaign portal server 110, and may pass the received tokens to decryption unit 540.

The configuration of functional components of content provider 120 illustrated in FIG. 5 is for illustrative purposes. Other configurations may be implemented. Therefore, content provider 120 may include additional, fewer and/or different functional components than those depicted in FIG. 5.

Figure 6:
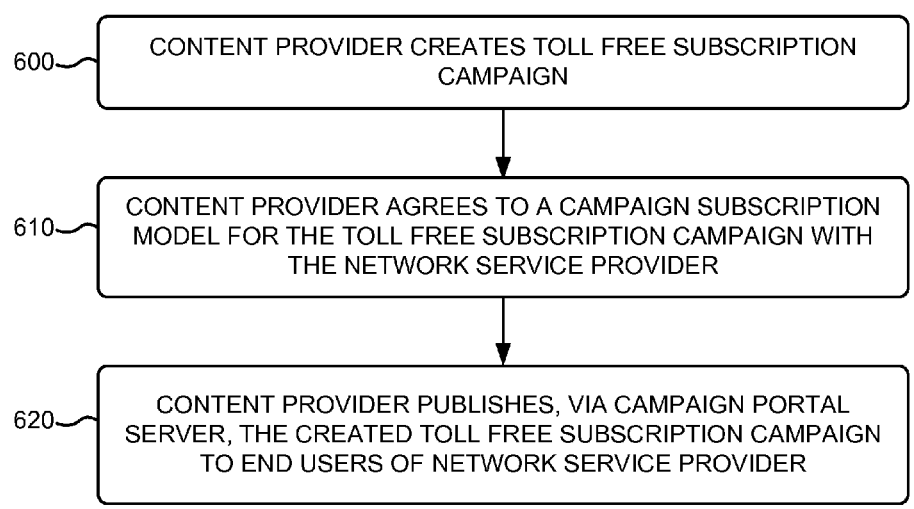
FIG. 6 is a flow diagram of an exemplary process for creating a toll free subscription campaign and publishing the campaign via the campaign portal server of FIG. 1.

FIG. 6 is a flow diagram of an exemplary process for creating a toll free subscription campaign and for publishing the campaign via campaign portal server 110. The exemplary process of FIG. 6 may be implemented by content provider 120, in conjunction with campaign portal server 110. The exemplary process of FIG. 6 is described below with reference to the messaging diagram of FIG. 7.

Figure 7:
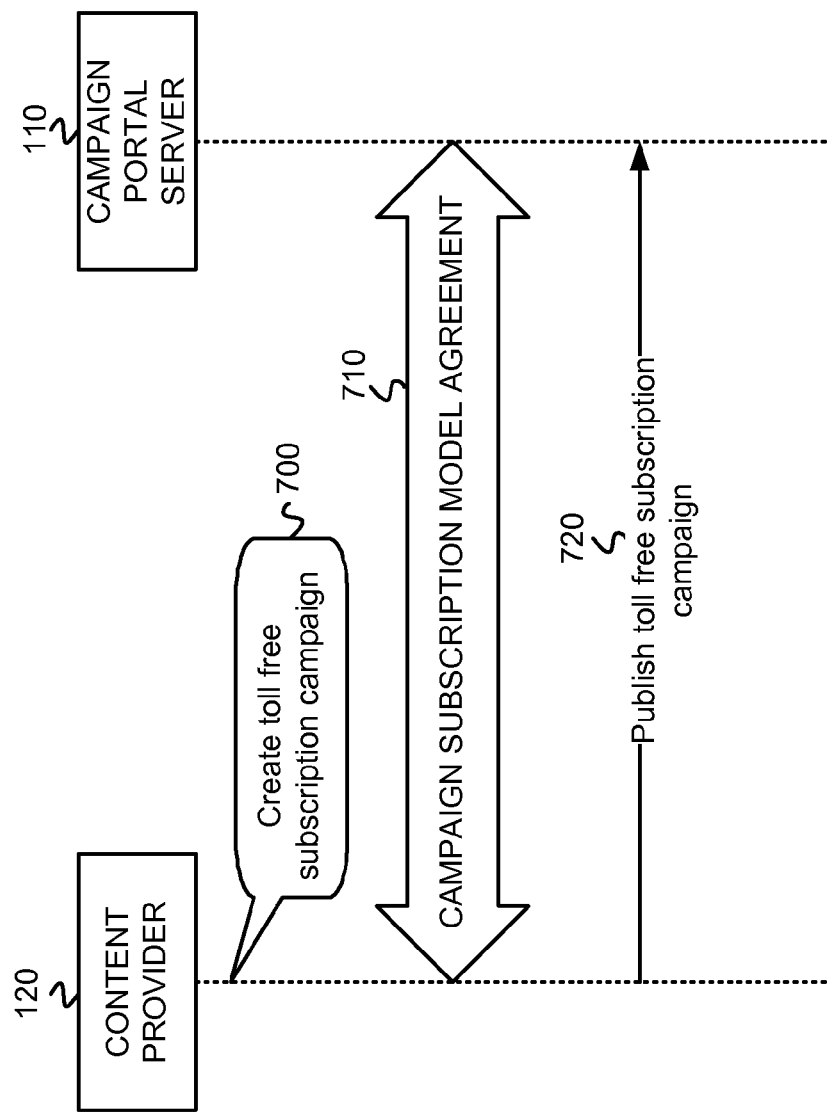
FIG. 7 is a messaging diagram associated with the exemplary process of FIG. 6.

The exemplary process may include content provider 120 creating a toll free subscription campaign (block 600). Creation of the toll free subscription campaign may include identifying media content (e.g., one or more items of streaming video such as, for example, a movie(s)) that is to be offered and published as a subscription data campaign via campaign portal server 110, assigning a unique campaign identifier to the media content, and generating descriptive data regarding the media content (e.g., name of media content, length in MB or GB, description of media content, graphics associated with the media content, etc.). The messaging diagram of FIG. 7 depicts content provider 120 creating 700 a toll free subscription campaign.

Content provider 120 agrees to a campaign subscription model for the toll free subscription data campaign with the network service provider (block 610). Content provider 120 may, via network 140, come to an agreement with the network service provider to offer the media content for viewing by end user 145 for a certain price, where a first percentage of the price is allocated to the network service provider and a second percentage of the price is allocated to the content provider 120, and with the network service provider agreeing to grant a quota of free network usage to end user 145 that may be used by end user 145 when receiving delivery of the media content associated with the data subscription campaign from content provider 120. FIG. 7 depicts content provider 120 and the network service provider (via campaign portal server 110) coming to an agreement 710 regarding a subscription model for a particular subscription data campaign.

Content provider 120 publishes, via campaign portal server 110, the created toll free subscription campaign to end users of the network service provider (block 620). Content provider 120 sends the created subscription data campaign (e.g., name of media content, length in MB, description of media content, graphics associated with the media content, price, quota of free network usage to be allocated to subscriber) to campaign portal server 110, and campaign portal server 110 "publishes" the subscription data campaign in conjunction with other subscription data campaigns provided by other content providers 120. FIG. 7 depicts content provider 120 sending a message 720 to campaign portal server 110 for publishing the toll free subscription data campaign. End user 145 (and other end users) may access, via user device 105 and campaign portal client app 150, the published subscription data campaigns stored at campaign portal server 110 and request a subscription to one or more particular subscription data campaigns, as described in further detail below with respect to the exemplary process of FIGS. 8A-8C. The exemplary process of FIG. 6 may be repeated by each of content providers 120-1 through 120-n for each created toll free subscription campaign.

Figure 8A:
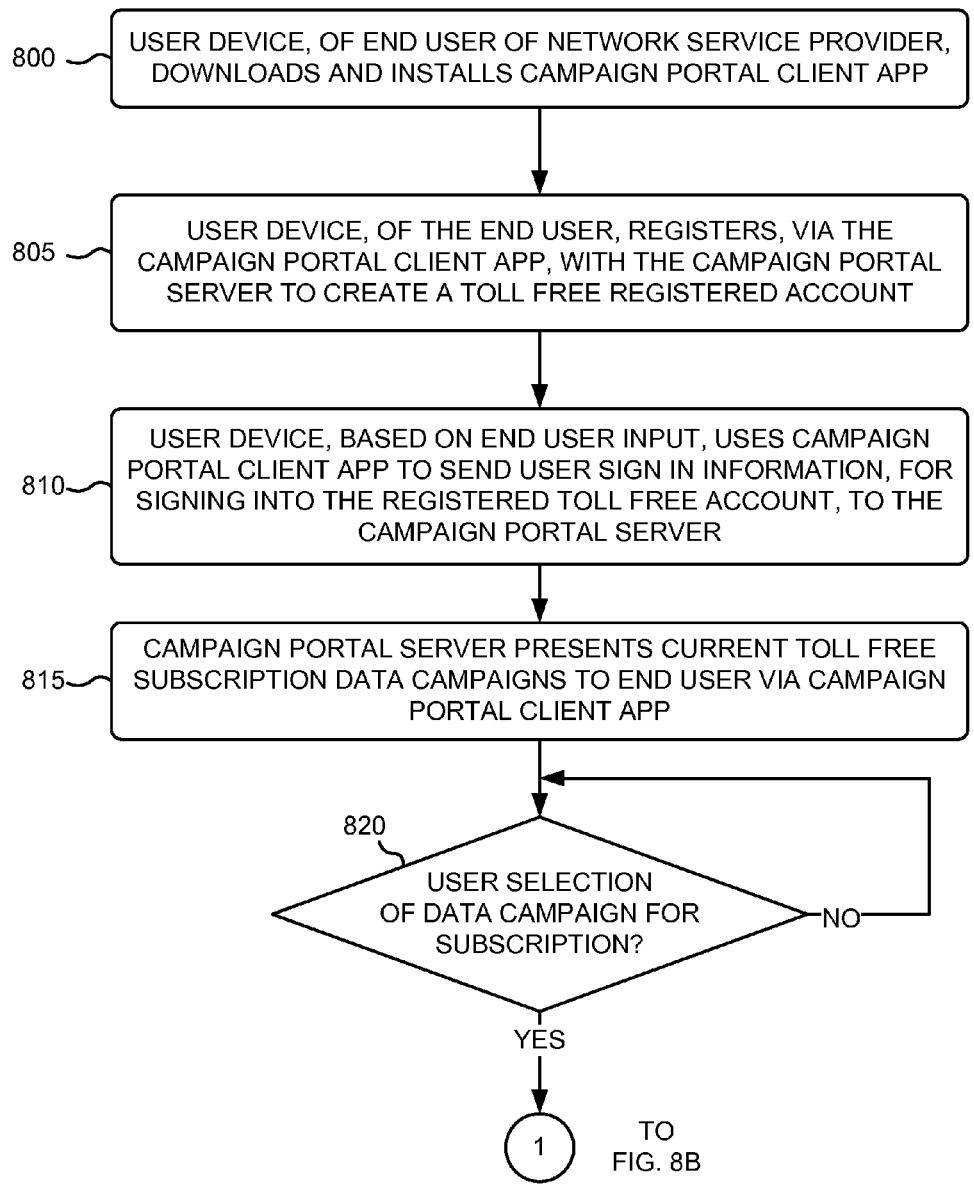
FIGS. 8A-8C are flow diagrams of an exemplary process for an end user to register with the campaign portal server of FIG. 1 and for attempting to subscribe to subscription data campaigns published by the campaign portal server.
Figure 8B:
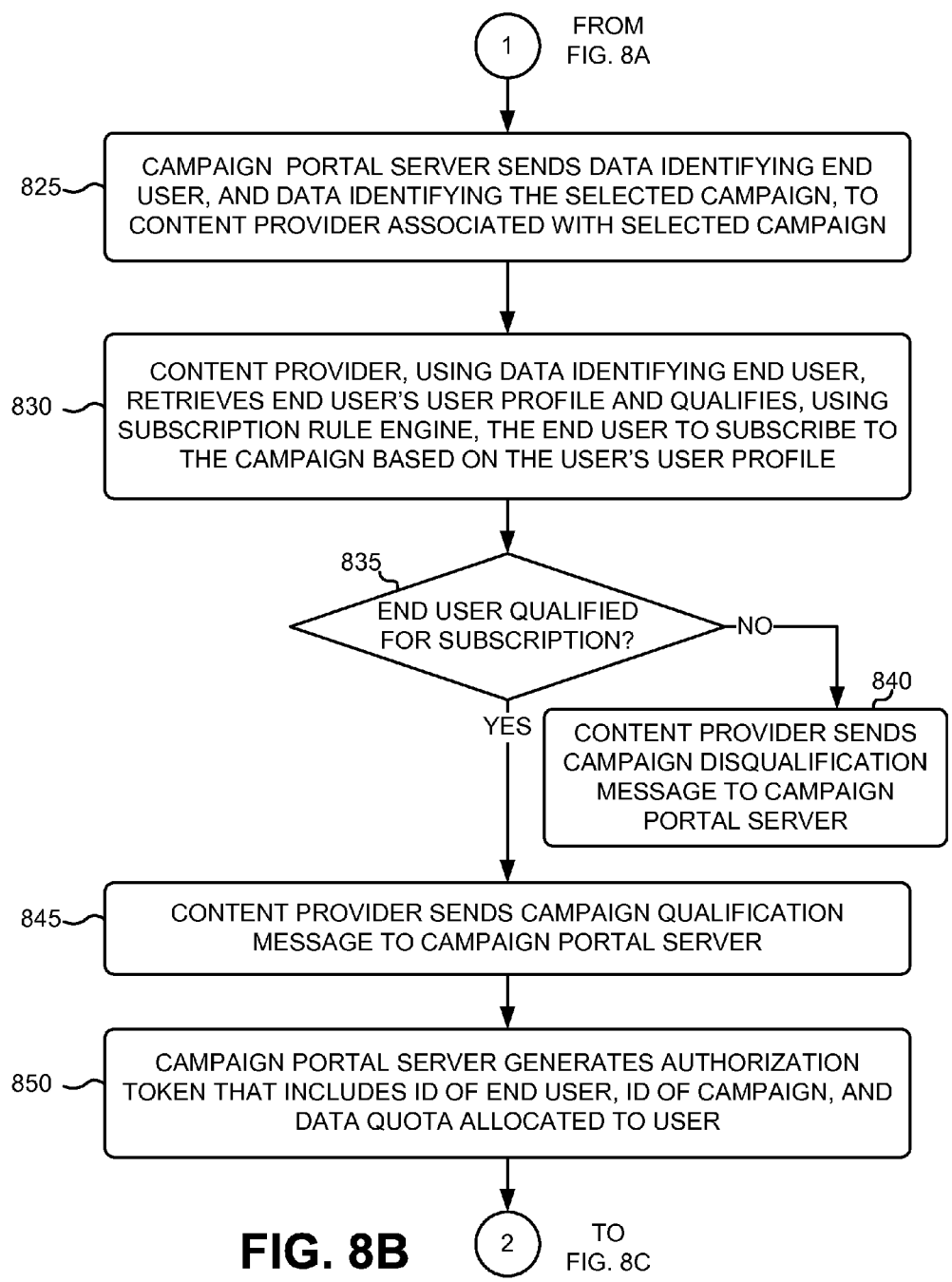
Figure 8C:
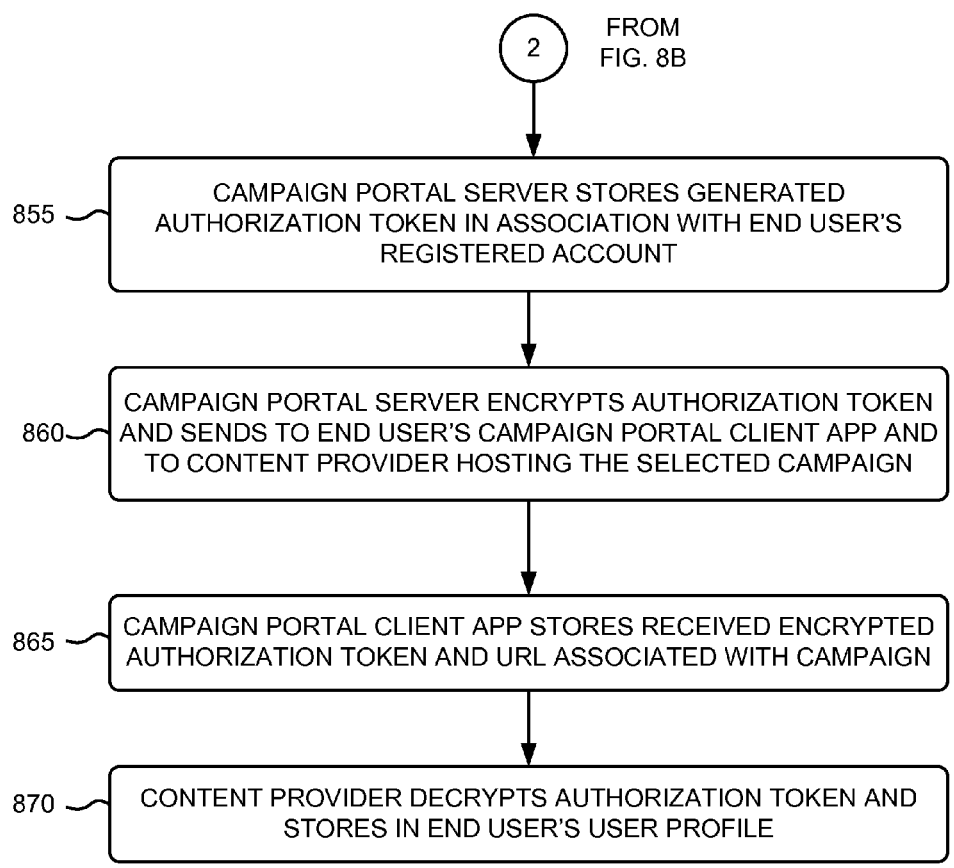

FIGS. 8A-8C are flow diagrams of an exemplary process for an end user to register with campaign portal server 110 and for attempting to subscribe to subscription data campaigns published by campaign portal server 110. The exemplary process of FIGS. 8A-8C may be implemented by user device 105, campaign portal server 110 and content provider 120. The exemplary process of FIGS. 8A-8C is described below with reference to the diagrams of FIGS. 9A and 9B.

Figure 9A:
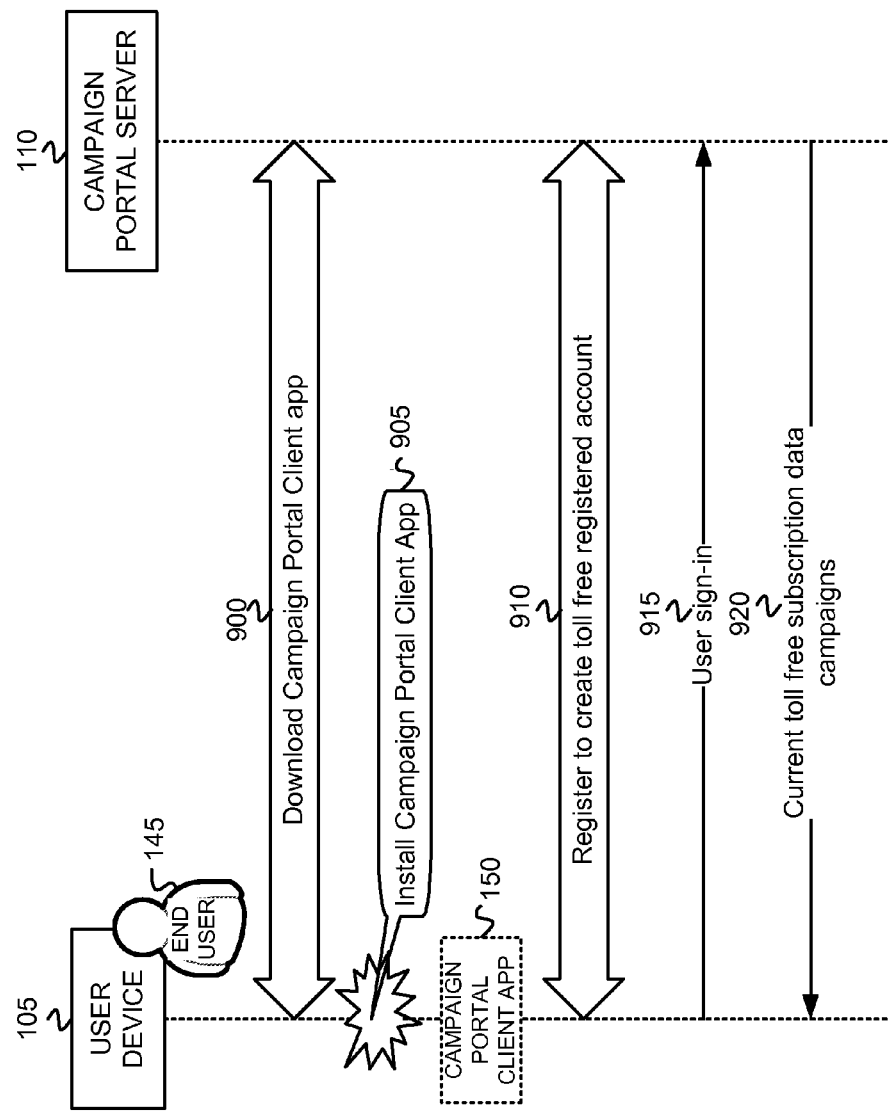
FIGS. 9A and 9B are messaging diagrams associated with the exemplary process of FIGS. 8A-8C.

The exemplary process includes user device 105, of the end user 145 of the network service provider, downloading and installing a campaign portal client application (app) 150 (block 805). User device 105, based on an instruction from end user 145, requests the downloading of campaign portal client app 150 from, for example, campaign portal server 110. In response, campaign portal server 110 uploads app 150 to user device 105 via network 140. Upon receipt of app 150, end user 145 instructs user device 105 to install app 150. FIG. 9A depicts user device 105 downloading 900 campaign portal client app 150 that was uploaded by campaign portal server 110, and installing 905 app 150 at user device 105.

User device 105, of end user 145, registers, via campaign portal client app 150, with campaign portal server 110 to create a toll free registered account (block 805). The registration may include, for example, a log-in name, a password, user identification information (e.g., name, address), and/or an email address. Campaign portal server 110 may assign a unique user identifier to end user 145 and may store the assigned unique user identifier in an end user ID field 410 of an entry 400 of campaign portal DB 115, and may store the registration information in user account information field 415 of the entry 400. FIG. 9A depicts end user 145 registering 910, via campaign portal client app 150 executing at user device 105, with campaign portal server 110 to create a toll free registered account. The registered toll free account permits end user 145 to request subscriptions to one or more subscription data campaigns published by campaign portal server 110.

User device 105, based on end user input, uses the campaign portal client app 150 to send user sign-in information, for signing into the registered toll free account, to campaign portal server 110 (block 810). End user 145 initiates execution of campaign portal client app 150 at user device 150 and, via a user interface of app 150, enters user sign-in information (e.g., login name and password of end user 145). As shown in FIG. 9A, campaign portal client app 150 sends a message 915 that includes the sign-in information to campaign portal server 110 via network 140 (not shown in FIG. 9A).

Campaign portal server 110 presents the current toll free subscription data campaigns to end user 145 via campaign portal client app 150 (block 815). Upon receipt of the user sign-in information, campaign portal server 110 may retrieve campaign information from fields 435-1 through 430-x of entries 405 of campaign portal DB 115 and may publish the current toll free subscription data campaigns to end user 145 via network 140 and campaign portal client app 150. The campaign information associated with each current toll free subscription data campaign may be presented via a user interface of campaign portal client app 150. FIG. 9A depicts campaign portal server 110 sending information 920 regarding current toll free subscription data campaigns to campaign portal client app 150 at user device 105.

Figure 9B:
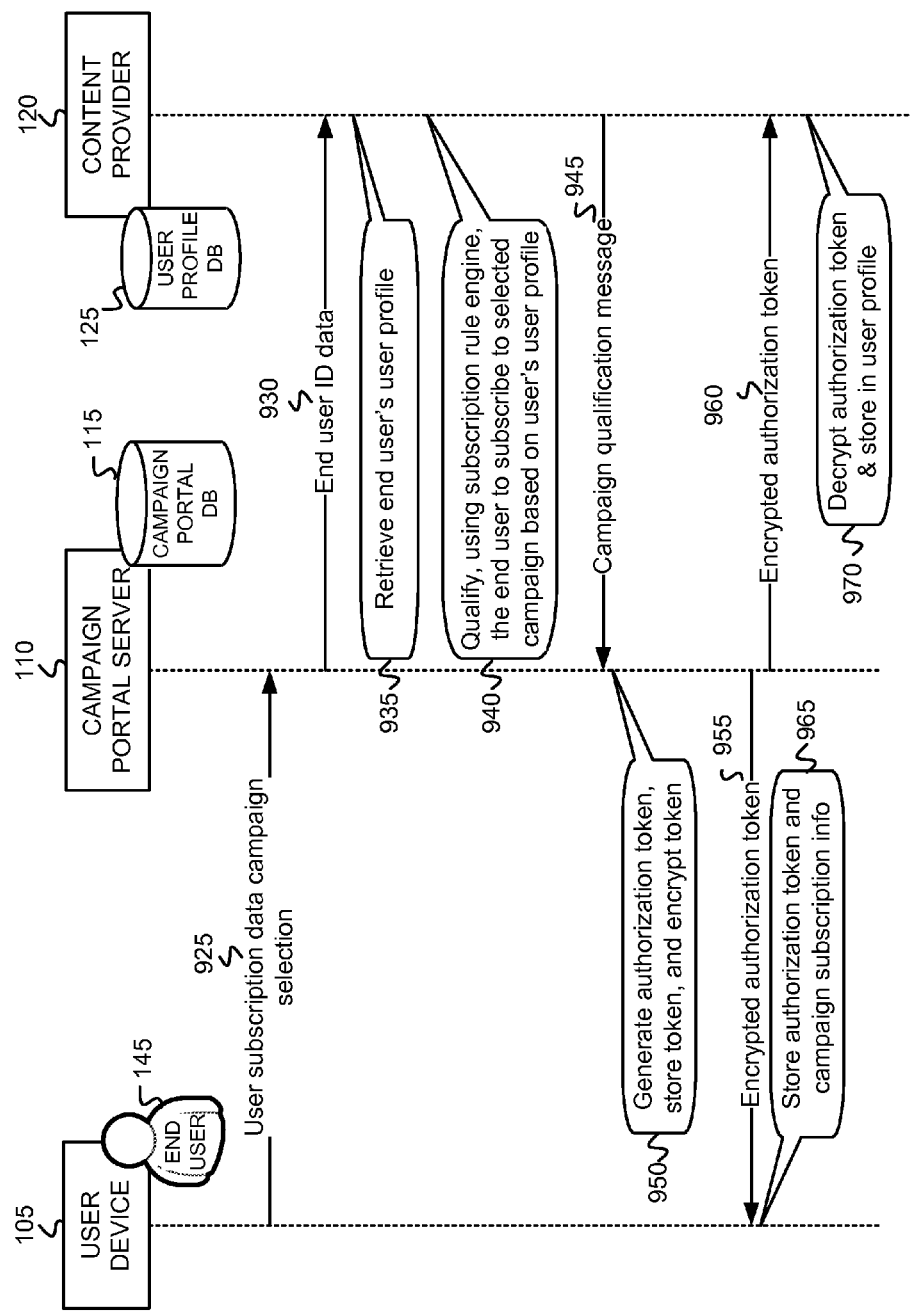

Campaign portal server 110 determines if there has been a user selection of a data campaign for subscription (block 820) from the presented current toll free subscription data campaigns. End user 145 may, via a user interface of campaign portal client app 150, select a current toll free subscription data campaign presented to end user 145 by campaign portal server 110. In an implementation in which the user interface of campaign portal client app 150 comprises a touch screen and a graphical user interface, end user 145 may "touch" an icon associated with the selected toll free subscription data campaign displayed on the touch screen of user device 105. FIG. 9B depicts a message 925, that includes an indication of the subscription data campaign selected by end user 145, being sent from user device 105 to campaign portal server 110 via network 140 (not shown in FIG. 9B).

If campaign portal server 110 has received a user selection of a data campaign for subscription (YES—block 820), then campaign portal server 110 sends data identifying end user 145 to the content provider 120 associated with the selected campaign (block 825). Campaign portal server 110 obtains end user 145's end user ID, and, as shown in FIG. 9B, sends a message 930 that includes end user ID data, to the content provider 120 that hosts the selected subscription data campaign.

Content provider 120, using the received data identifying end user 145, retrieves end user 145's user profile from user profile DB 125 and qualifies, using campaign subscription rule engine 520, end user 145 to subscribe to the campaign based on the user's user profile (block 830). FIG. 9B depicts content provider 120 retrieving 935 end user 145's user profile from user profile DB 125, and qualifying 940, using subscription rule engine 520, end user 145 to subscribe to the user-selected subscription data campaign based on end user 145's user profile. Campaign subscription rule engine 520 implements a set of subscription rules that determine which end users may, or may not, qualify to subscribe to a given subscription data campaign being offered by a content provider 120 via campaign portal server 110. The set of subscription rules, for example, may randomly choose which end users qualify to subscribe to the subscription data campaign when those end users have little or no data in their user profiles. For established end users, having extensive user profiles maintained by user profile unit 510, the set of subscription rules implemented by rule engine 520 may qualify end users who previously utilized toll free data more effectively than other end users. For example, an end user who previously utilized 2 Gigabytes (GB) of free data usage allocated to him/her by watching two paid high definition (HD) movies may be qualified for the subscription data campaign, whereas another end user that only used ten percent of 2 GB of the free data usage allocated to him/her and spent nothing on paid content may be disqualified for the subscription data campaign.

If content provider 120, using campaign subscription rule engine 530, determines that end user 145 is not qualified for a subscription to the user-selected subscription data campaign (NO—block 835), then content provider 120 sends a campaign disqualification message to campaign portal server 110 (block 840). If content provider 120, using campaign subscription rule engine 530, determines that end user 145 is qualified for a subscription to the user-selected subscription data campaign (YES—block 835), then content provider 120 sends a campaign qualification message to campaign portal server 110 (block 845), and continues at block 850. FIG. 9B shows content provider 120 returning a campaign qualification message 945 to campaign portal server 110.

At block 850, campaign portal server 110 generates an authorization token that includes an ID of end user 145, an ID of the subscribed campaign, and a data quota allocated to the user for the subscribed campaign. Campaign portal server 110 stores the generated authorization token, in association with end user 145's registered account, in campaign portal DB 115 (block 855), and encrypts the authorization token and sends the encrypted authorization token to end user 145's campaign portal client app 150, and to content provider 120 that is hosting the selected campaign (block 860). FIG. 9B shows campaign portal server 110 generating 950 the authorization token, storing the token in campaign portal DB 115, and encrypting the token. FIG. 9B further depicts campaign portal server 110 sending a message 955 that includes the encrypted authorization token to user device 105, and a message 960 that also includes the encrypted authorization token to content provider 120.

Campaign portal client app 150 stores the received encrypted authorization token and a Uniform Resource Locator (URL) associated with the subscribed data campaign (block 865). FIG. 9B depicts user device 105, after receiving message 955, storing 965 the authorization token and campaign subscription information locally at user device 105. Content provider 120 decrypts received authorization token and stores in end user 145's user profile (block 870). FIG. 9B shows content provider, after receiving message 960, decrypting 970 the authorization token and storing in end user 145's user profile in user profile DB 125.

Blocks 810 through 870 of FIGS. 8A-8C may be selectively repeated by end user 145 for signing into end user's registered toll free account and for selecting a different current toll free subscription data campaign for requesting a subscription.

Figure 10A:
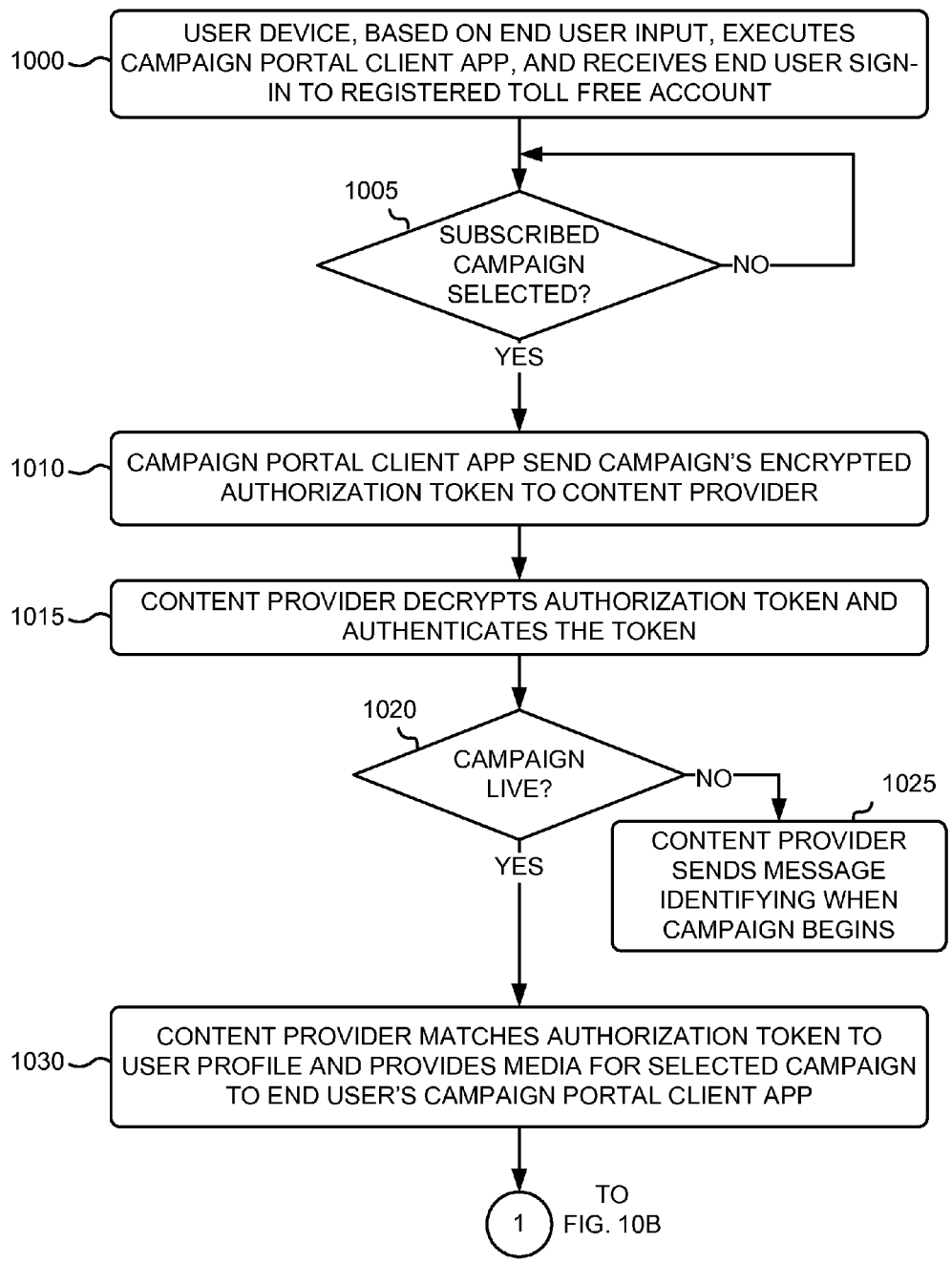
FIGS. 10A and 10B are flow diagrams of an exemplary process for an end user to select and receive media content associated with a subscription data campaign to which the end user has previously successfully subscribed.
Figure 10B:
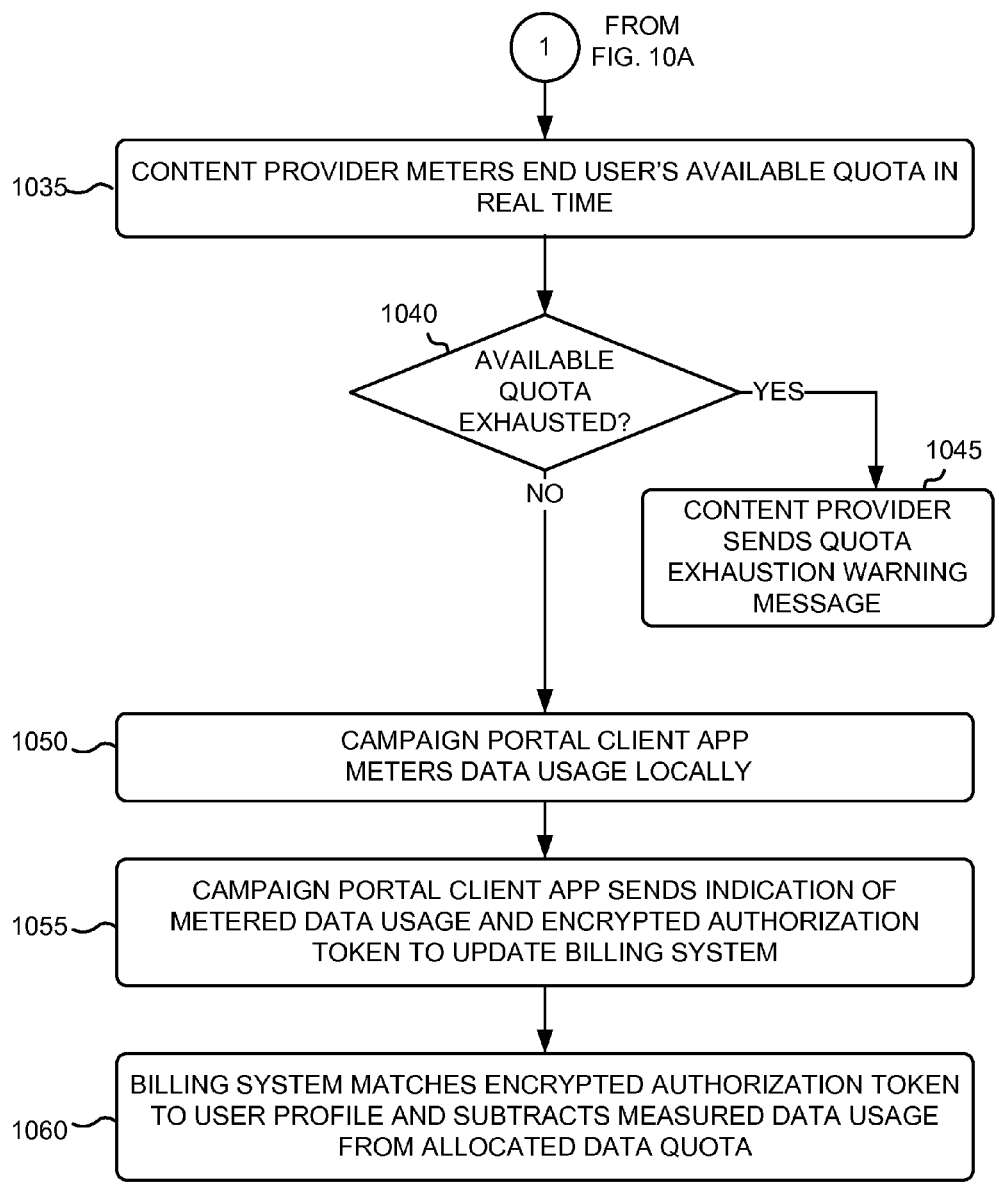

FIGS. 10A and 10B are flow diagrams of an exemplary process for end user 145 to select and receive media content associated with a subscription data campaign to which end user 145 has previously successfully subscribed. The exemplary process of FIGS. 10A and 10B may be implemented by user device 105, campaign portal server 110 and content provider 120. The exemplary process of FIGS. 10A and 10B is described below with reference to the diagram of FIG. 11.

Figure 11:
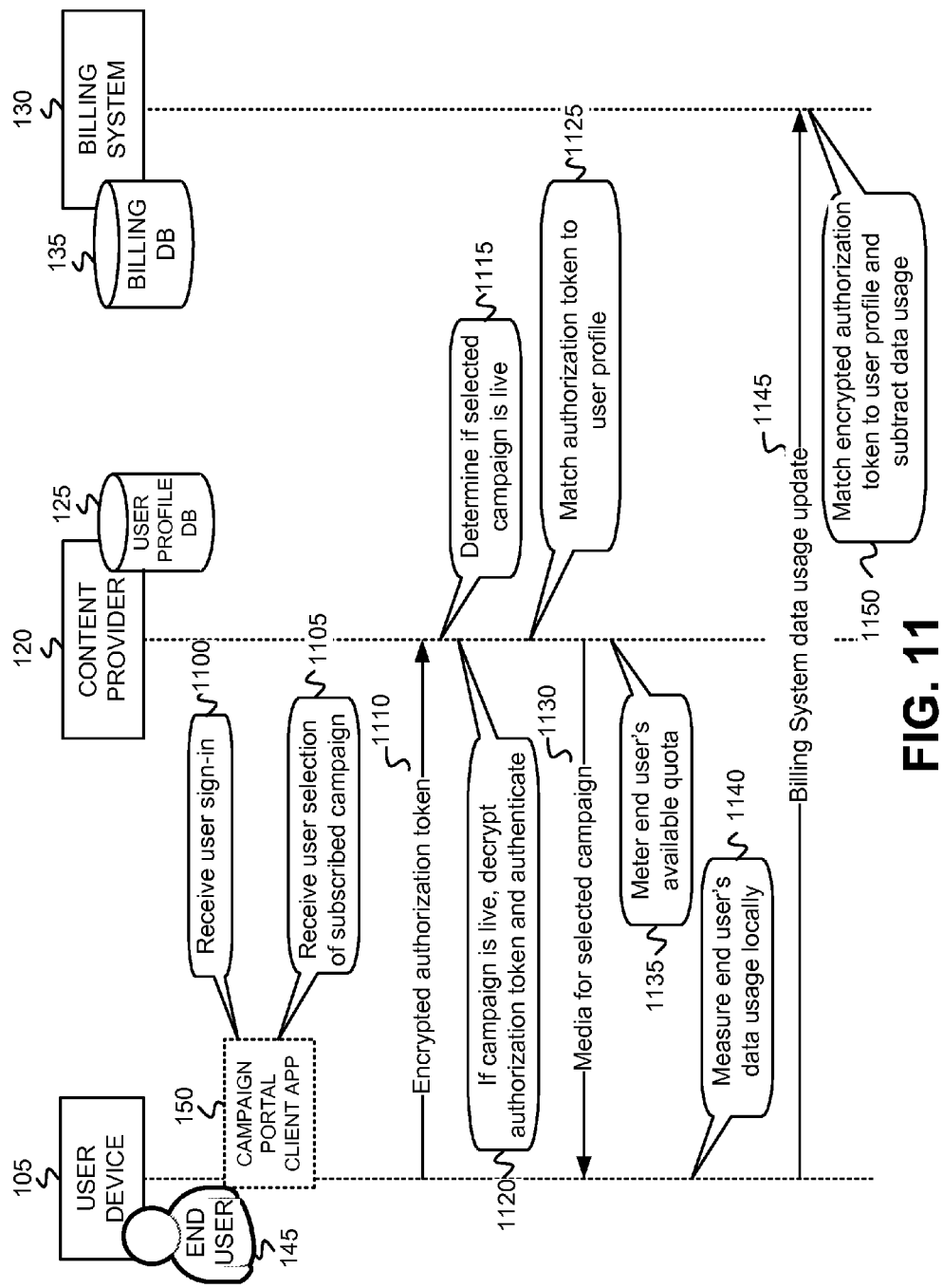
FIG. 11 is a messaging diagram associated with the exemplary process of FIGS. 10A and 10B.

The exemplary process may include user device 105, based on end user input, executing campaign portal client app 150 and receiving end user 145's sign-in to the registered toll free account (block 1000). Further, campaign portal client app 150 determines if end user 145 has selected a subscribed campaign (block 1005). FIG. 11 depicts campaign portal client app 150 receiving 1100 end user 145's sign-in, and receiving 1105 end user 145's selection of a previously subscribed campaign.

If end user 145 has selected a specific subscribed campaign (YES—block 1010), then campaign portal client app 150 sends the campaign's encrypted authorization token to content provider 120 (block 1010). Campaign portal client app 150 retrieves the encrypted authorization token for the selected campaign (previously received in blocks 860 and 865 of FIG. 8C) and, as shown in FIG. 11, sends a message 1110 that includes the encrypted authorization token to content provider 120.

Content provider 120 decrypts the received authorization token and authenticates the token (block 1015). Content provider 120 uses a decryption algorithm that corresponds to the encryption algorithm used by campaign portal server 110 to decrypt the authorization token. Authentication of the token may include using various different known authentication techniques for authenticating the token.

Content provider 120 determines if the selected campaign is currently live (block 1020). Each subscription data campaign may be offered for subscription for a only certain period of time, and may then only be available for delivery at a certain time. The certain time may be a pre-specified day and time, or it may be upon the occurrence of a certain event (e.g., when a threshold number of subscriptions have been received). FIG. 11 depicts content provider 120 determining 1115 if the selected subscription data campaign is live. If the selected campaign is not live (NO—block 1020), then content provider 120 sends a message to user device 105 identifying when the selected campaign begins (block 1025). If content provider 120 determines that the selected campaign is currently live (YES—block 1020), then content provider 120 matches the authorization token to a user profile and provides media for the selected campaign to end user 145's campaign portal client app 150 (block 1030). Content provider 120, after decryption of the authorization token, extracts the end user ID from the authorization token and performs a lookup into user profile DB 125 to identify an entry 300 having an identifier in field 310 that matches the end user ID extracted from the authorization token. Content provider 120 compares the decrypted authorization token with the authorization tokens stored in fields 330-1 through 330-m of the identified entry 300 to find a matching authorization token. Once the matching authorization token is found in fields 330-1 through 330-m of the identified entry 300, content provider 120 may extract the campaign identifier from the decrypted authorization token, retrieve the media content from storage that corresponds to the campaign identifier, and begin delivery of the media content to user device 105. FIG. 11 depicts content provider 120 matching 1125 the decrypted authorization token to a user profile, and sending the media 1130 for the selected campaign to user device 105.

Content provider 120 meters end user 145's available quota in real time (block 1035). As content provider 120 delivers the media content associated with the selected subscription data campaign to end user 145 at user device 105, content provider 120 meters the network usage (e.g., measures the used quantity of data) and subtracts the metered data from the quota of free data allocated to end user 145 upon subscribing to the subscription data campaign. For example, if 2 MB of the media content has just been delivered to user device 105, and a 2 GB quota of free data was originally allocated to end user 145, then content provider may subtract the 2 MB from the 2 GB to obtain the resulting remaining amount of the toll free quota that is available. FIG. 11 depicts content provider 120 metering 1135 end user 145's available quota of free data.

Content provider 120 determines if end user 145's available quota is exhausted (block 1040). Content provider 120 checks the remaining amount of the free quota that is available, from block 1035, and determines if the amount is zero. If the available quota is exhausted (YES—block 1040), then content provider 120 sends a quota exhaustion warning message to end user 145 (block 1045). Content provider 120 sends the quota exhaustion warning message to user device 105 via network 140 to warn end user 145 that if there is any further media content associated with the subscription data campaign to be delivered (i.e., when the amount of data of the media content exceeds the quota of free data allocated to the subscriber), then end user 145 will be charged for regular data usage according to his data usage plan with the network service provider.

If end user 145's available quota is not exhausted (NO—block 1040), then campaign portal client app 150 continues to measure end user 145's data usage locally (block 1050). Campaign portal client app 150, as media content for the subscription data campaign is delivered to user device 105 via network 140, measures the incoming quantity of media data to determine the current local usage. FIG. 11 depicts campaign portal client app 150 of user device 105 measuring 1140 end user 145's local data usage, associated with the delivered media content. Campaign portal client app 150 sends an indication of measured data usage, and the encrypted authorization token for end user 145 and the subscription data campaign, to update billing system 130 (block 1055). FIG. 11 shows user device 105 sending a message 1145 to billing system 130 that includes an update of end user 145's data usage associated with the delivered media content for the subscription data campaign. Message 1145 may include the current measured data usage, and the encrypted authorization token associated with the subscription data campaign.

Billing system 130 matches the received encrypted authorization token to a user profile, and subtracts the measured data usage from the allocated data quota (block 1060). Upon receipt of the message from user device 105, billing system 130 retrieves a user profile from billing DB 135 that corresponds to the authorization token and subtracts the measured data usage, received from user device 105, from the remaining amount of the previously allocated data quota for the subscription data campaign. FIG. 11 depicts billing system 130 matching 1150 the encrypted authorization token to a particular user profile, and subtracting the measured data usage.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6, 8A-8C, 10A and 10B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, at a first network device, multiple subscription data campaigns, wherein each of the multiple subscription data campaigns comprises media content, a free data usage quota, and a price for receiving the media content;

presenting, by the first network device, the multiple subscription data campaigns, via a network, to a user device associated with a user;

receiving, at the first network device, a selection of one of the multiple subscription data campaigns from the user;

sending, from the first network device to a second network device, data identifying the user and data identifying the selected one of the multiple subscription data campaigns;

retrieving, at the second network device, a user profile associated with the user;

granting, at the second network device, a subscription to the selected one of the multiple subscription data campaigns based on applying a set of campaign subscription rules to the retrieved user profile, wherein the retrieved user profile includes data related to usage of previously allocated free data by the user, and wherein applying the set of campaign subscription rules comprises applying at least one first campaign subscription rule of the set of campaign subscription rules to the data, related to usage of previously allocated free data, to determine how much of the previously allocated free data was used by the user and wherein granting the subscription is further based on how much of the previously allocated free data was used by the user;

sending a message, from the second network device to the first network device, that indicates that the user has successfully subscribed to the selected one of the multiple subscription data campaigns;

generating, at the first network device, an authorization token that includes an identifier of the user, an identifier of the selected one of the multiple subscription data campaigns, and the free data usage quota;

encrypting, at the first network device, the authorization token;

sending, from the first network device to the second network device, the encrypted authorization token; and delivering, from the second network device to the user device, media content associated with the selected one of the multiple subscription data campaigns.

2. The method of claim 1, wherein the multiple subscription data campaigns are received from a plurality of different network devices, and wherein the plurality of different network devices includes the second network device.

3. The method of claim 2, wherein the plurality of different network devices are associated with content providers that deliver media content.

4. The method of claim 1, wherein the free data usage quota comprises an amount of data that the user may receive for free via a network service provider associated with the network.

5. The method of claim 4, wherein the network service provider comprises a Public Land Mobile Network (PLMN) service provider.

6. The method of claim 1, wherein the user device comprises a device that includes functionality for playing media content and for connecting with the network via a wired or wireless connection.

7. The method of claim 6, wherein the user device comprises one of a cellular telephone, a personal digital assistant (PDA), or a tablet, desktop, palmtop, laptop or wearable computer.

8. A system, comprising:
a first network device configured to:
receive multiple subscription data campaigns, wherein each of the multiple subscription data campaigns comprises media content, a free data usage quota, and a price for receiving the media content,
store the multiple subscription data campaigns in a database,
present the multiple subscription data campaigns, via a network, to a user device associated with a user,
receive, via the network, a selection of one of the multiple subscription data campaigns from the user device,
send, to a second network device via the network, data identifying the user and data identifying the selected one of the multiple subscription data campaigns, wherein the second network device hosts media content associated with the selected one of the multiple subscription data campaigns,
receive, from the second network device via the network, an indication that the user has successfully subscribed to the selected one of the multiple subscription data campaigns,
retrieve, from the database, a first free data usage quota corresponding to the selected one of the multiple subscription data campaigns,
allocate the first free data usage quota to the user,
generate an authorization token that includes an identifier of the user, an identifier of the selected one of the multiple subscription data campaigns, and an indication of the first free data usage quota allocated to the user,
encrypt the authorization token, and
send, to the second network device via the network, the encrypted authorization token, wherein the second network device uses the encrypted authorization token for determining whether to deliver media content associated with the selected one of the multiple subscription data campaigns to the user.

9. The system of claim 8, wherein the first free data usage quota comprises an amount of data that the user may receive for free via a network service provider associated with the network.

10. The system of claim 9, wherein the network service provider comprises a Public Land Mobile Network (PLMN) service provider.

11. The system of claim 8, further comprising:
the second network device configured to:
receive, from the first network device, the data identifying the user and data identifying the selected one of the multiple subscription data campaigns,
retrieve a user profile associated with the user,
grant a subscription to the selected one of the multiple subscription data campaigns based on the retrieved user profile, and
send a message, to the first network device, that indicates that the user has successfully subscribed to the selected one of the multiple subscription data campaigns, based on the granting of the subscription to the selected one of the multiple subscription data campaigns.

12. The system of claim 8, wherein the multiple subscription data campaigns are received from a plurality of different network devices, and wherein the plurality of different network devices includes the second network device.

13. The system of claim 12, wherein the plurality of different network devices are associated with content providers that deliver media content.

14. The system of claim 8, wherein the user device comprises a device that includes functionality for playing media content and for connecting with the network via a wired or wireless connection.

15. A non-transitory computer-readable medium storing instructions executable by at least one processing unit, the computer-readable medium comprising one or more instructions for:
receiving multiple subscription data campaigns, wherein each of the multiple subscription data campaigns comprises media content, a free data usage quota, and a price for receiving the media content;
causing the multiple subscription data campaigns to be presented to a first user device associated with a first user;
causing the multiple subscription data campaigns to be presented to a second user device associated with a second user;
receiving a selection of a first one of the multiple subscription data campaigns from the first user device;
receiving a selection of a second one of the multiple subscription data campaigns from the second user device;
causing to be sent, to a second network device, data identifying the first user and data identifying the selected first one of the multiple subscription data campaigns, wherein the second network device hosts media content associated with the selected first one of the multiple subscription data campaigns;
causing to be sent, to a third network device, data identifying the second user and data identifying the selected second one of the multiple subscription data campaigns, wherein the third network device hosts media content associated with the selected second one of the multiple subscription data campaigns;

receiving, from the second network device, an indication that the first user has successfully subscribed to the selected first one of the multiple subscription data campaigns;

receiving, from the third network device, an indication that the second user has successfully subscribed to the selected second one of the multiple subscription data campaigns;

generating a first authorization token that includes an identifier of the first user, an identifier of the selected first one of the multiple subscription data campaigns, and an indication of a first free data usage quota allocated to the first user;

generating a second authorization token that includes an identifier of the second user, an identifier of the selected second one of the multiple subscription data campaigns, and an indication of a second free data usage quota allocated to the second user;

encrypting the first authorization token and the second authorization token;

causing to be sent, to the second network device, the encrypted first authorization token, wherein the second network device uses the encrypted first authorization token for determining whether to deliver media content associated with the selected first one of the multiple subscription data campaigns to the first user; and causing to be sent, to the third network device, the encrypted second authorization token, wherein the third network device uses the encrypted second authorization token for determining whether to deliver media content associated with the selected second one of the multiple subscription data campaigns to the second user.

16. The non-transitory computer-readable medium of claim 15, wherein the multiple subscription data campaigns are received from a plurality of different network devices, and wherein the plurality of different network devices includes the second network device and the third network device.

17. The non-transitory computer-readable medium of claim 16, wherein the plurality of different network devices are associated with content providers that deliver media content.

18. The non-transitory computer-readable medium of claim 15, wherein the first free data usage quota comprises a first amount of data that the first user may receive for free via a network service provider associated with the network and wherein the second free data usage quota comprises a second amount of data that the second user may receive for free via the network service provider.

19. The non-transitory computer-readable medium of claim 18, wherein the network service provider comprises a Public Land Mobile Network (PLMN) service provider.

20. The non-transitory computer-readable medium of claim 15, wherein the first user device and the second user device each comprises a device that includes functionality for playing media content and for connecting with the network via a wired or wireless connection.

* * * * *